United States Patent [19]

Madsen

[11] 4,206,496

[45] Jun. 3, 1980

[54] ELECTRONIC FLARE-UP LIGHT SYSTEM

[76] Inventor: Andrew Madsen, P.O. Box 313, Alamo, Calif. 94507

[21] Appl. No.: 803,762

[22] Filed: Jun. 6, 1977

[51] Int. Cl.$^2$ .................................................. B60Q 1/12
[52] U.S. Cl. ..................................... 362/61; 362/223; 362/221; 362/297
[58] Field of Search ................... 362/61, 62, 223, 221, 362/296, 297, 222; 340/80, 331, 332

[56] References Cited

U.S. PATENT DOCUMENTS

| | | | |
|---|---|---|---|
| 3,619,600 | 11/1971 | Kryder | 362/222 |
| 3,737,651 | 6/1973 | Shute | 362/222 |
| 3,781,853 | 12/1973 | Jacobs | 340/331 X |
| 3,883,846 | 5/1975 | Bruner | 340/82 X |
| 3,973,168 | 8/1976 | Kearsley | 340/331 X |

Primary Examiner—Brooks H. Hunt
Assistant Examiner—J. L. Barr
Attorney, Agent, or Firm—Roger A. Marrs

[57] ABSTRACT

A flare-up lighting device is disclosed herein having an elevated platform mounting a plurality of spatially disposed flash tube pairs so that omni-directional light propagation is provided. A timing network is included in the electronic circuit for energizing selected pairs of the flash tubes so that a predetermined flash pattern is produced. Hemispherical and hemispheroid specular reflectors are disposed behind selected ones of the flash tube pairs for enhancing visual display.

8 Claims, 8 Drawing Figures

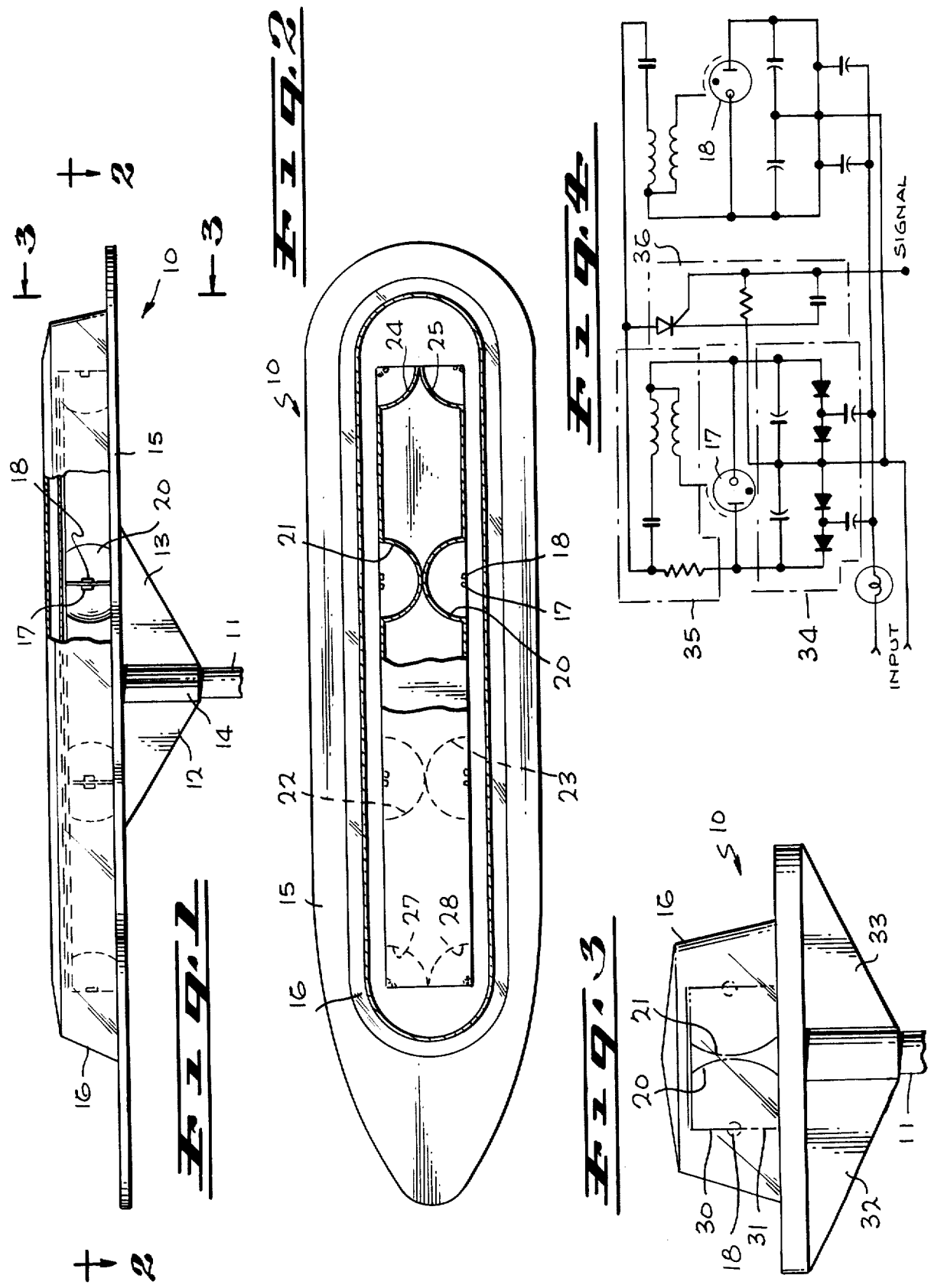

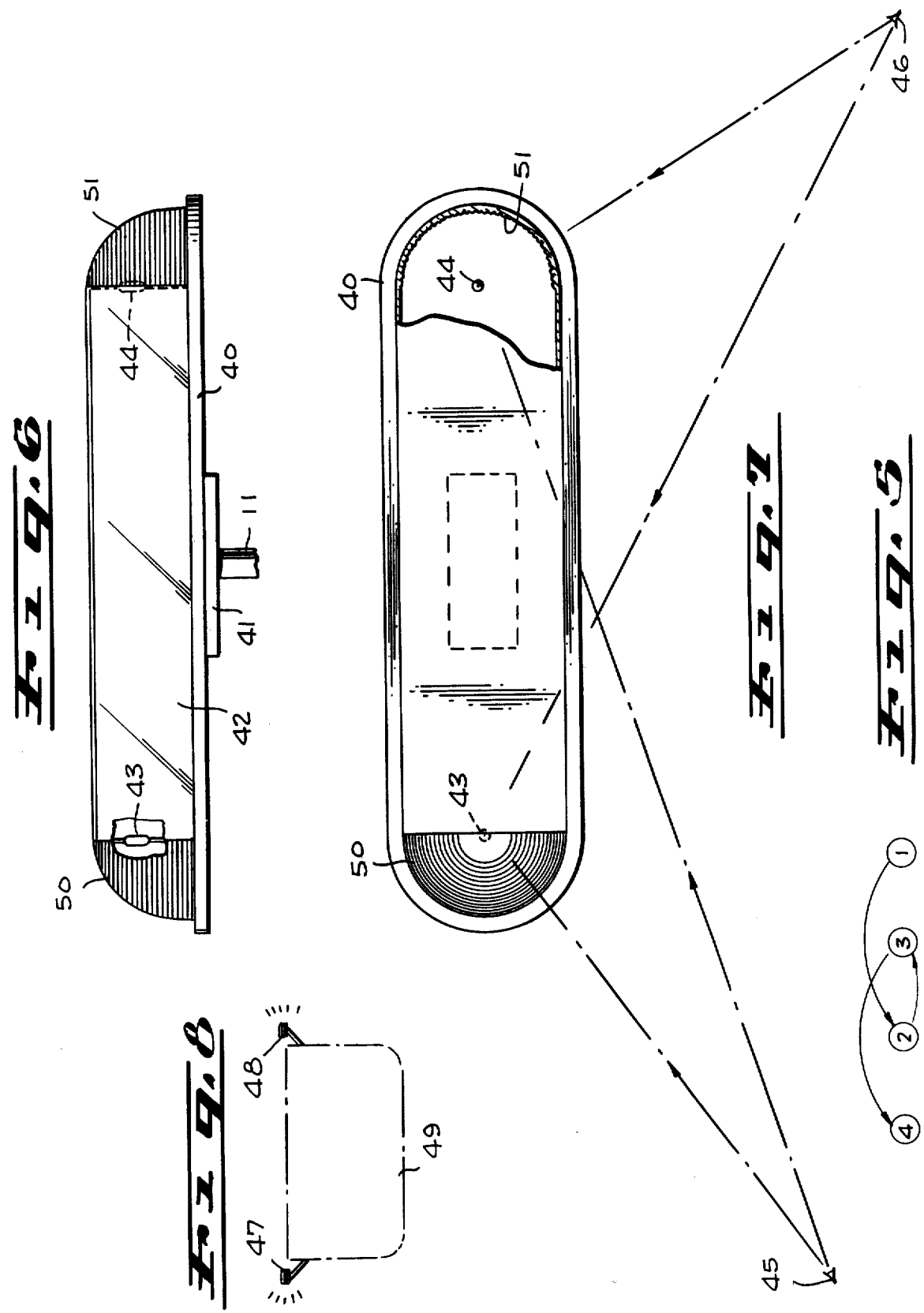

ELECTRONIC FLARE-UP LIGHT SYSTEM

BACKGROUND OF THE INVENTION

1. Field of the Invention

The present invention relates to lighting systems for marine vessels and more particularly, to an external lighting system of the intermittent flare-up type adapted to attract the attention of observers in the vicinity of the vessel on which the system is installed.

2. Description of the Prior Art

External lighting aboard marine vessels is for the prime purpose of supplying visual information so that mariners may avoid close quarter situations and collisions. In addition to the prescribed port and starboard side lights, mast and range lights, there are governmental regulations and rules covering the employment of a flare-up light as a recent innovation in the field of lighting to attract attention. A flare-up light as a light source may be and has been a light source such as bundle of burning twigs, all types of lanterns, flashlights, and incandescent intermittent white light beacons. Brightness and apparent movement are the two features that give a flare-up light the ability to attract attention.

Difficulties and problems have been encountered with conventional flare-up lights which stem largely from the fact that some are inconvenient to use and require considerable maintenance. Others are rather short lived and in other instances, observer range is limited and restricted.

Therefore, the purpose of the present invention is to provide a marine flare-up lighting system overcoming the aforementioned problems which embodies extremely bright short duration light sources in combination with a novel optical arrangement so constructed and operated that a conspicuous and attention attracting visual signal is produced and displayed.

SUMMARY OF THE INVENTION

Accordingly, the above problems and difficulties are obviated by the present invention which provides a novel electronic flare-up light system incorporating an elongated platform mounting a plurality of flash tubes in pairs constituting multiple light sources. The plurality of light sources are spatially disposed on the platform so that omni-directional light propagation is provided. The light power sources are operated in a predetermined sequence by a timing means which energizes selected pairs of the light power sources thereby displaying the impression of movement. Hemispherical and hemispheroid specular reflectors are disposed on the platform behind selected ones of the light power sources for enhancing visual display.

Therefore, it is among the primary objects of the present invention to provide a novel external lighting system adapted to serve as a visual attention attraction and particularly for employment on a marine vessel.

Another object of the present invention is to provide a novel external lighting system of the flare-up type adapted to indicate the presence of a marine vessel or vehicle over substantial distances in all types of visibility conditions.

Still another object of the present invention is to provide a novel external lighting system for marine vehicles employing a plurality of spaced pairs of light sources of extremely high brightness, such as provided by electronic capacitor discharge flash tubes, along the side of a longitudinal axis of a luminaire which is mounted at great height over the vessel and in alignment with its keel.

Still a further object of the present invention is to provide a system as described employing means for sequentially energizing the light sources in a abaft-to-fore direction at time intervals whereby the impression of movement is provided.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of the novel external lighting system of the present invention carried at the top of a mast mounted on a marine vessel;

FIG. 2 is a longitudinal cross sectional view of the novel lighting system shown in FIG. 1 as taken in the direction of arrows 2—2 thereof;

FIG. 3 is a transverse cross sectional view of the system taken in the direction of arrows 3—3 of FIG. 1;

FIG. 4 is a schematic diagram showing the electronic circuit including the timing means for energizing the light sources included in the lighting system of FIGS. 1 and 2;

FIG. 5 is a diagrammatic view showing the sequence of energization for the respective light sources;

FIG. 6 is a side elevational view of a simplified version of the present invention;

FIG. 7 is a top plan view of the simplified lighting system shown in FIG. 6; and FIG. 8 is a cross sectional view of the external lighting system incorporating the simplified device shown in FIGS. 6 and 7.

DESCRIPTION OF THE PREFERRED EMBODIMENT

Referring to FIG. 1, a novel luminaire is illustrated in the general direction of arrow 10 which is carried on a marine vessel such as a tanker or freighter and is mounted along its keel axis elevated above the command area of the vessel. The luminaire is preferrably carried on the top of a mast 11 and is braced in fixed securement thereto by means of gussets 12 and 13 carried on a tube fitting 14.

The luminaire comprises an elongated platform 15 on which a transparent housing 16 is carried for enclosing a plurality of light sources and their associated optics. In one form, the light source comprises a pair of flash tubes 17 and 18 which are operably connected to an electronic power and energizing circuit.

Each of the light sources is positioned in front of a reflector such as the reflector 20 located behind the flash tube pairs 17 and 18.

As shown in FIG. 2, at least four light sources are arranged on each side of the platform 15 so that a total of eight flash tube pairs are provided. Each of the flash tubes are secured in the center point of portions of hemispherical and hemispheroid specular reflectors. The hemispherical reflectors are identified by numerals 20-23 respectively while the hemispheroid reflectors are identified by numerals 24-27 respectively. The aft reflectors represented by numerals 24 and 25 are hemispheroids as well as the forward reflectors 26 and 27. However, the light sources between the fore and aft reflectors are provided with the hemispherical reflectors 21-23 inclusive. Therefore, the luminaire 10 is composed of four pairs of light sources taking the form of flash tubes and the reflector optics are sequenced so that the aft light source is initially flashed followed by the forward center pair of flash tubes or light source and then the aft center pair of flash tubes or light source is flashed. Completing the flare pulse sequence, the forward pair of flash tubes or light source is flashed again. By this means, an articulated display is achieved and greater apparent motion is accomplished giving a distinctive and attention attracting light signal of novel character.

In FIG. 3, it can be seen that the transparent shield or cover 16 completely encloses the array of light sources and reflectors. The individual flash tubes are mounted so that their leads are substantially vertical as indicated by numerals 30 and 31 associated with flash tube 18. Transverse brackets 32 and 33 further support the platform 15 on the top of mast 11.

Referring to the circuit shown in FIG. 4, flash tubes 17 and 18 are illustrated in connection with an energizing circuit. Each of the flash tube pairs is provided with a capacitor bank and a power source, such as generally indicated by numeral 34. The power circuit or source comprises an isolation transformer to adjust the line voltage of the marine vessel supply to the voltage necessary for charging the capacitor bank, rectifiers included therewith and to convert the alternating current to direct current for charging of the capacitors. Each of the sources, such as identified by numeral 35, has associated therewith a triggering circuit which typically may comprise a transformer and condenser to provide the energy for the high voltage triggering pulse. The circuity further includes a timing circuit 36 such that the time interval between the flashing of adjacent flash tube pairs, or groups, is on the order of one fifteenth of a second, such interval corresponding with the visual impression of apparent movement. The tube pairs are spaced approximately twenty inches apart in a horizontal plane.

The flashing of the array sequence is illustrated in FIG. 5 wherein the forward light sources are initially flashed so that the aft pair is flashed followed by the forward center pair flashing and then the aft center pair flashing. Sequence is completed when the forward pair is flashed. The flash tube pair spacing and the time interval between the individual light sources causes a flare signal to appear to the eye as light in reaction rather than individual flashes of light. Viewed at narrow visual angles, the optical arrangement of the luminaire allows the flare signal to increase suddenly in brightness (intensity) thereby simulating the movement when the vessel heading is towards the observer. Viewing from abaft, the flare signal decreases suddenly which simulates movement. The high intensity (brightness) of the light sources together with their apparent movement to the eye attracts attention with respect to both ahead and side vision (central and peripheral vision).

Another embodiment of the present invention is illustrated in FIGS. 6 and 7 which include a sequential flashing lighting system having a platform 40 carried on the end of a mast 11 by a bracket 41. A transparent shield 42 encloses the flash tubes and light sources 43 and 44 are located at opposite ends of the platform. No reflectors are employed to magnify brightness since the light of the flash from the light sources augment or are considered additive.

For example, in FIG. 7, an observer 45 views both light radiating from sources 43 and 44 while another observer 46 views similar combined light radiation. Preferrably, each flash sequence occurs at source 43 first followed by source 44 about 150 milliseconds later. Dwell of each source is approximately 150 milliseconds and the sequence is repeated every 1500 milliseconds. Therefore, the flash combination will occur about 40 times per minute.

FIG. 8 illustrates the employment of the FIGS. 6 and 7 embodiment as a side light representing port light 47 and starboard light 48 carried on the sides of a vessel 49. Fresnel lens 50 and 51 may be employed to enhance brightness.

Therefore, in view of the foregoing it can be seen that an electronic flare-up light system for shipboard external lighting is provided. The conspicuity of the system extends, to an appreciable and useful degree, the visual ranges of lookouts in all types of visibility conditions, thereby reducing the chance of ship-to-ship collisions. The extended visual range afforded allows a longer period of time to take action should an evasive maneuver be necessary. The advantages of the inventive system are achieved broadly by the employment of a plurality of spaced pairs of condenser-discharge light sources of high brightness along the sides of the longirudinal axis of a luminaire which is above the command area and in alignment with the keel of a marine vessel or vehicle. Each pair of light sources consists of starboard and port placement and the pairs of light sources are sequentially energized in an abaft-to-fore direction. Time intervals between the individual light sources is in the order of the time of persistence of retinal impression characteristics of the eye thereby, displaying the impression of movement (phi-phenomena).

The light sources are located in the radius of portions of hemispherical and hemispheroidal specular reflectors. The center reflectors being hemispherical and the aft and fore being hemispheroidal. The reflectors are abreviated hemisphere and hemispheroids so all the luminious emittance area of the condenser-discharge or flash tube light sources are unobstructed by the reflectors and chassis or platform. The sequential flare pulse light signal is displayed intermittently at approximately twenty times per minute. The signal offers the visual impression of movement due to the fusion of the successive spaced impressions into one continuous sensation. Viewed at narrow angles, the optical arrangement of the luminaire is such that the light signal increases in brightness when the vessel is headed towards an observer, conversely the light signal decreases in brightness when the vessel is headed away from the observer. The sudden increase or decrease in brightness affords the visual impression of motion. Viewed broadside, the light signal apparent movement is in the direction of the heading of the equipped vessel. The brightness of the flare pulse light signal together with the apparent movement has the ability to attract attention with respect to both central and peripheral vision. The stated optical design of the invention allows the display of movement three hundred and sixty degrees horizontally.

The luminaire 10 is so constructed that the command and deck area of the equipped marine vessel is shaded from the light emissions by the flare-up light platform.

The sources emit millions of peak candlepower for each flare signal. The individual flashes which form the display occur in approximately a millisecond hence, the distraction generally associated with high intensity lights is not a factor.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A flare-up lighting device for marine vessels carried on the end of a mast comprising:
   an elongated platform;
   a plurality of light sources carried on at least the opposite ends of said platform in spaced apart relationship wherein said elongated platform blocks light radiation underneath said light sources;
   a transparent shield disposed on said platform enclosing said light sources;
   each of said light sources is a pair of flash tubes and said plurality of light sources are arranged in an array of pairs of flash tubes;
   electronic circuit means interconnecting said light sources for sequentially energizing selected ones of said light sources to produce a predetermined flash pulse to indicate vessel heading;
   timing means operably incorporated into said circuit means for establishing said sequential energization whereby said light sources are sequentially energized in an abaft-to-fore direction and the time intervals between energization of said light sources is in the order of the time of persistence of retinal impression characteristics of an observer's eye thereby displaying the impression of movement such as when an increase in said flash pulse intensity provides an observer with an impression of vessel heading away from him while a decrease in said flash pulse intensity provides the observer with an impression of vessel heading towards him.

2. The invention as defined in claim 1 wherein:
   said light source array comprises a light source at each corner of said elongated platform representing fore and aft light sources and a pair of said light sources on each side of said platform representing a central fore pair of light sources and a central aft pair of light sources.

3. The invention as defined in claim 2 wherein:
   said aft light sources are energized initially in said predetermined sequence followed by energization of said fore central light sources, said aft central light sources and their said fore light sources.

4. The invention as defined in claim 1 including:
   a reflector carried on said platform behind each of said light sources.

5. The invention as defined in claim 4 wherein:
   light sources located in the corners of said elongated platform are backed by hemispheroid reflectors and light sources disposed on each side of said platform centrally located between said corner light sources are backed by hemispherical reflectors.

6. The invention as defined in claim 5 wherein:
   said light sources are covered by a transparent shield carried on said platform.

7. The invention as defined in claim 1 wherein:
   said light sources comprise a flash tube disposed at opposite ends of said platform sequentially energized at about 100–150 milliseconds therebetween.

8. The invention as defined in claim 7 including:
   a Fresnel lens carried on said platform covering each of said light sources.

* * * * *